(12) United States Patent
Chen (10) Patent No.: US 6,342,842 B2
(45) Date of Patent: Jan. 29, 2002

(54) EARTHQUAKE ALARM DEVICE

(76) Inventor: Cheng-I Chen, No. 22-24 Ting-Wei Road, Tu-Ku Town, Yun-Lin Hsien (TW)

( * ) Notice: Subject to any disclaimer, the term of this patent is extended or adjusted under 35 U.S.C. 154(b) by 0 days.

(21) Appl. No.: 09/833,693

(22) Filed: Apr. 13, 2001

(30) Foreign Application Priority Data

Apr. 21, 2000 (TW) ...................................... 89206747 U (51) Int. Cl.⁷ ............................................... G08B 21/00
(52) U.S. Cl. ..................... 340/690; 340/686.1; 340/689
(58) Field of Search ............................. 340/690, 686.1, 340/689; 200/61.45 R, 61.52

(56) References Cited

U.S. PATENT DOCUMENTS

| 4,945,347 A | * | 7/1990 | Perry | ........................ 340/689 |
| 5,418,523 A | * | 5/1995 | Anderson et al. | ........... 340/690 |
| 5,546,076 A | * | 8/1996 | Foerster | ...................... 340/690 |
| 5,633,463 A | * | 5/1997 | Szasz | .......................... 73/654 |
| 5,682,834 A | * | 11/1997 | Croghan | ........................ 116/4 |
| 6,121,888 A | * | 9/2000 | Bognar | ....................... 340/690 |

* cited by examiner

*Primary Examiner*—Edward Lefkowitz
(74) *Attorney, Agent, or Firm*—Rosenberg, Klein & Lee (57) ABSTRACT

An earthquake alarm device mainly includes a housing, vertical vibration detecting system, a horizontal vibration system, a battery and an alarm set. There is a spring with a specific spring coefficient k and the spring is connected to a weight. Once the earthquake happens, it will activate one of both of the vertical and the horizontal vibration detecting system so that a warning voice or voices are created. It can be activated by other magnetic or electrical method. In addition, the sensitivity of the vertical and/or the horizontal vibration detecting can be adjusted. After the earthquake is gone, it will return to its original state automatically. It will not be affected by the location. So, it is very convenient and precise in use.

5 Claims, 9 Drawing Sheets

EARTHQUAKE ALARM DEVICE

BACKGROUND OF INVENTION

1. Field of the Invention

The present invention relates to an earthquake alarm device, especially to an earthquake alarm device which can detect the vertical and horizontal vibrations independently, can easily adjust their sensitivities, and can automatic return to its original state.

2. Description of the Prior Art

Concerning the conventional alarm devices for emergency escaping systems such as the smoke detecting device, gas leaking detecting device and other security systems, all these alarm devices can protect the lives and properties of people. However, there is no earthquake alarm device in the current commercial market. Therefore, people are eager to have an alarm device that can detect the earthquake in order to minimize the lost caused by the earthquake.

For example, Taiwan is located in the earthquake zone on the boundary of the Euro-Asian block. Earthquakes happen very frequently and they are impossible or very hard to be predicted. The earthquake is one of the most powerful and destructive natural disasters. Particularly, the severe earthquake happed in Taiwan on Sep. 21, 1999 is one example that the earthquake happens at the midnight. Most people are sleeping. There is no any information or warning about the earthquake for people to escape. Therefore, it is strongly desired to invent a new product that can immediately provide the earthquake information to the persons who sleep or work so that these persons can choose a best escape way.

SUMMARY OF THE INVENTION

The major object of the present invention is to provide an earthquake alarm device. It is easy to install, easy to adjust, easy to return to its original state, able to detect for the vertical and the horizontal vibration independently, able to alarm people, and able to adjust the sensitivities for the vertical and horizontal vibration detecting.

An earthquake alarm device comprising:

a housing, a vertical vibration detecting system, a horizontal vibration system, a battery and an alarm set;

said vertical vibration detecting system including a first detecting set and a second detecting set; said first detecting set being composed of a non-conductive vertical vibration adjusting element, a wire with a non-conductive outer wrap, a spring holding seat, a detective spring, a detective element, and a weight; said second detective set being composed of a non-conductive horizontal vibration adjusting element, a hanging spring, a detecting tube top cover, a half-insulated steel tube having a non-conductive inner wall, and a vertical vibration detective seat; said vertical vibration detective seat being conductive; when an earthquake containing a vertical vibration, due to said weight, said detective spring being moving up and down so as to cause a vertically vibration, said detective spring being disposed inside and limited by the half-insulated steel tube and performing a vertical movement, so that said detective element of said first detecting set contacts with said vertical vibration detecting seat so as to form an electrical loop to activate a vertical alarm of the alarm set; by mean of an outer thread of said vertical vibration adjusting element, said first detecting set being engaged into a non-conductive inner thread of said horizontal vibration adjusting element of said second detecting set; and an outer thread of said horizontal vibration adjusting element being engaged into an inner thread of an upper end of a horizontal sliding ball so as to secure said first and second detecting sets; and said horizontal swinging detecting system including another detecting set which is composed of a fixed tube upper cover, a fixed tube and a horizontal detecting seat; said horizontal vibration detective seat being conductive; when said earthquake containing a horizontal vibration, due to said weight, said hanging spring being repeatedly horizontally swung so as to cause a horizontally vibration, so that said weight contacts with said horizontal vibration detecting seat so as to form an electrical loop to activate a horizontal alarm of the alarm set; wherein an outer thread of said fixing tube upper cover being engaged in an inner thread of a lower end of said horizontal sliding ball so that said sliding ball can be disposed on a horizontal sliding ball seat in said housing with free sliding.

DETAILED DESCRIPTION OF THE PREFERRED EMBODIMENT

The present invention is an earthquake alarm device. By analyzing the vibration type of an earthquake, the present invention mainly including two sub systems, namely the vertical vibration detecting system and the horizontal swinging (or vibration) detecting system. When an earthquake occurs, this invention can independently detect the vibration type and the amplitude thereof. Then, it will independently activate the related alarms. Therefore, it can provide a warning at a crucial moment for escape. Also, the people can immediately know the information about the vibration type of the earthquake.

Figure 1:
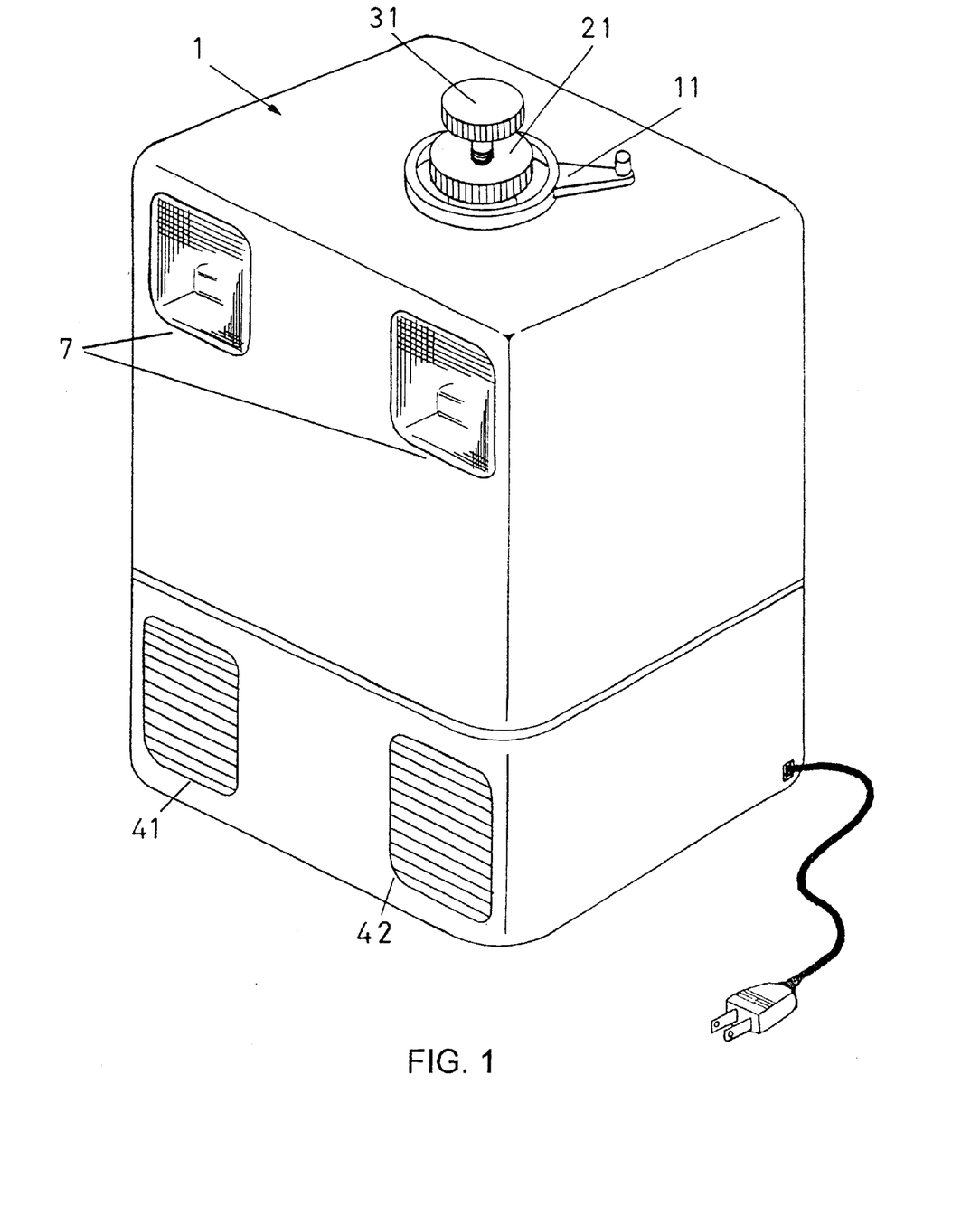
FIG. 1 is a perspective view of the present invention.

More specifically, this invention's structure comprises the following three portions:

(1) housing (as shown in FIG. 1): The function of the housing 1 is to provide a space to contain all the related structures and elements, such as a charger, a battery, an alarm set, light, etc. And, after installation at palace, a positioning system will be automatically positioning to a normal condition.

Figure 2:
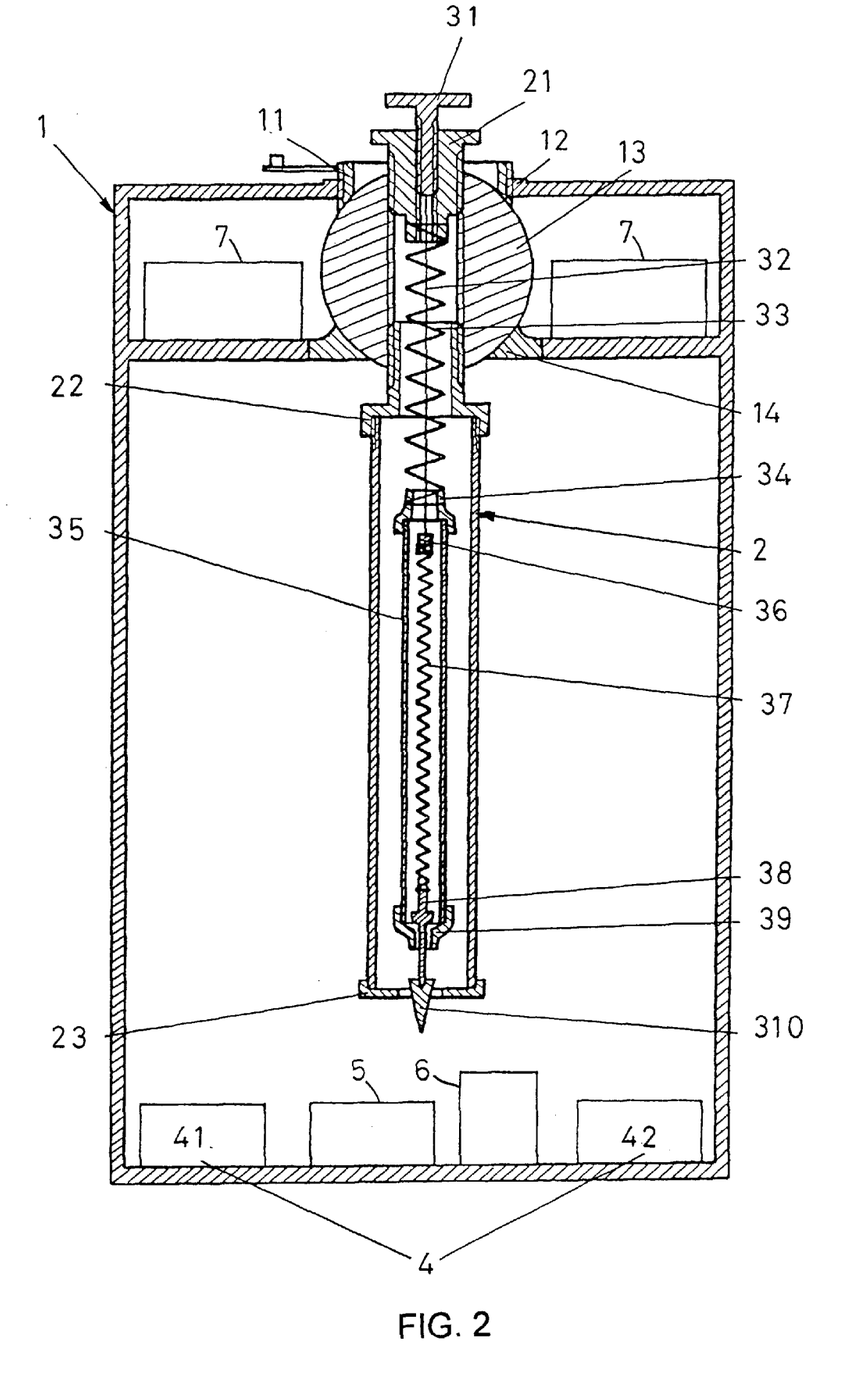
FIG. 2 illustrates the inner structure of the present invention.

(2) horizontal swinging detecting system (as shown in FIG. 2): It is mainly composed by a fixing tube 2 and related detecting elements. Its main function is to detecting the information about the horizontal vibration.

(3) vertical vibration detecting system (as shown in FIG. 2): It is mainly composed by a detecting tube 3 and related detecting elements. Its main function is to receive the information of the vertical vibration.

Figure 3:
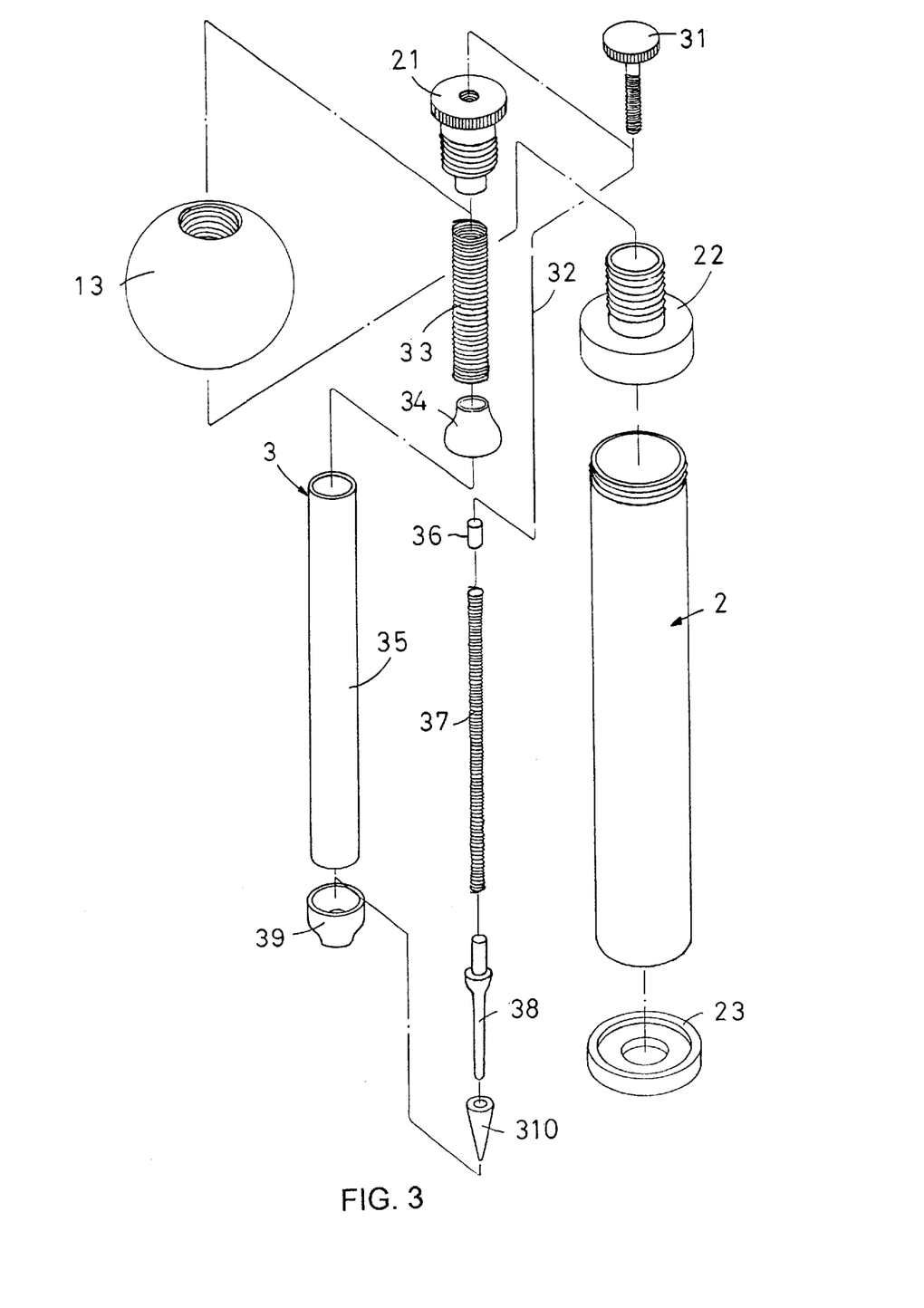
FIG. 3 is a disassembled perspective view of major parts of the present invention.

Referring to FIGS. 2 and 3, the detailed structure of this invention is described as follows.

Figure 4:
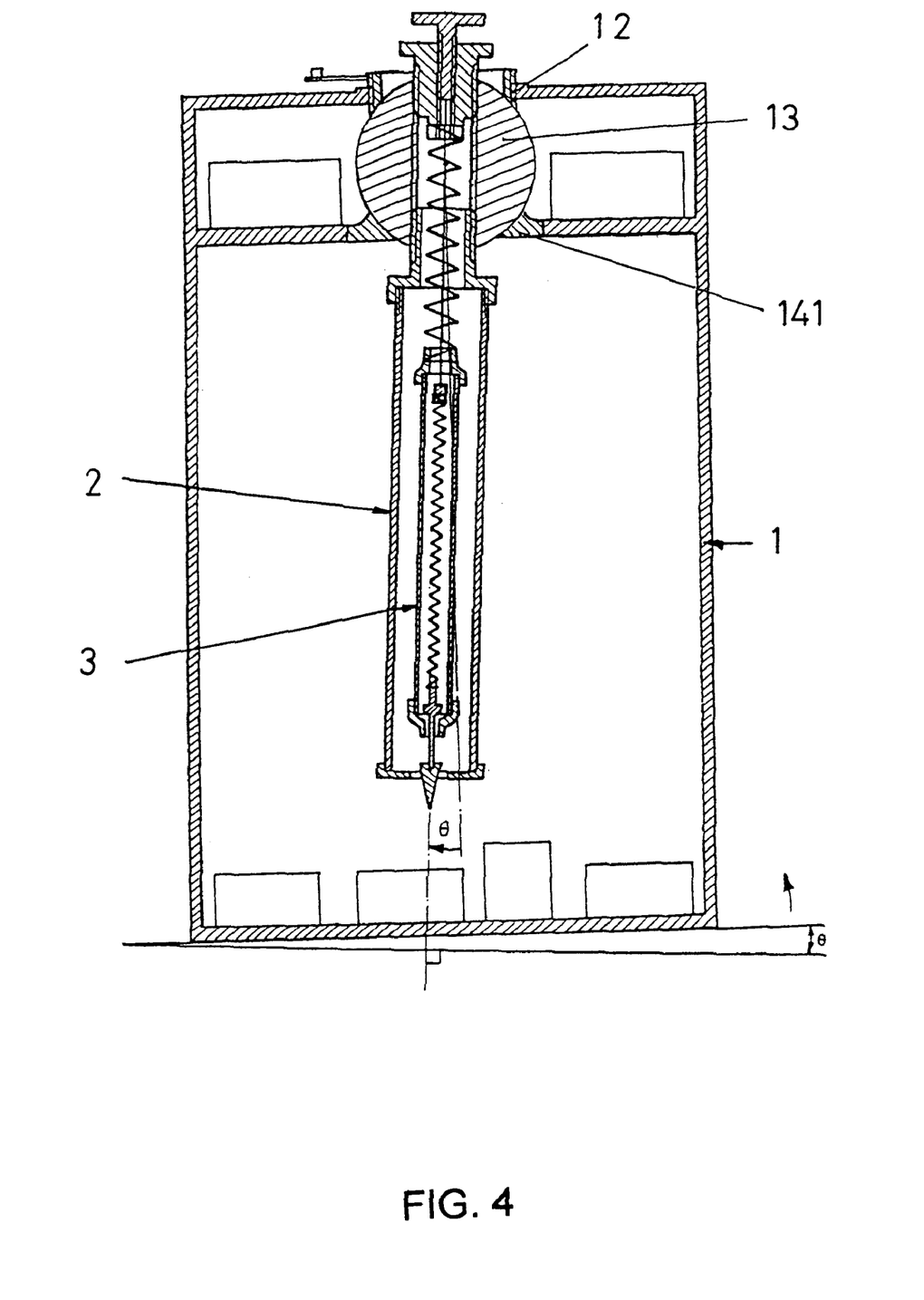
FIG. 4 shows the automatically positioning structure.

A housing 1 is disposed. Its upper end has a locking knob seat 12 with a hole. This hole has an inner thread for engaging with a fixing tube locking knob 11 that has an outer thread. By means of a spherical recess on the bottom of the fixing tube locking knob 11, a horizontal sliding ball 13 can be quickly and firmly locked. This makes the fixing tube 2 and the detecting tube 3 towards down to the center of the earth. Thus, it will not be affected by the horizontal condition of the ground where this invention is installed (as shown in FIG. 4). In order to make sure the tilted condition at the place after installed, a tilted angle θ is formed under this 3-demensional condition between a central axis of the housing 1 an the axis of the fixing tube 2 and detecting tube 3 (towards to the center of the earth). The horizontal sliding ball 13 is disposed on a spherical recess of the housing I for providing a 3-dimentional movement. This is defined as the horizontal sliding ball seat 14 for providing the automatic positioning function.

With regard to the upper end of the housing 1, a non-conductive vertical vibration adjusting knob 31, a non-conductive horizontal vibration adjusting knob 21 and a fixing tube locking knob 11 are disposed thereon. At the bottom of the housing 1, based on a simple electrical connection, the loop(s) can be connected among these two detecting systems and battery, an alarm set, etc (this kind of simple electrical loop is just a prior art). When an earthquake occurs, the battery 6 Mill send a signal to the alarm set 4 to send out certain voice(s) (like a speaker or beeper). This alarm set 4 includes a horizontal alarm 41 and a vertical alarm 42. Thus, it can detect different types of the earthquake. If it is out of electricity, by mean of the charger 5, the light 7 will be activated automatically for emergency escape. At the normal time for stand by, the charger 5 can be charged continuously. After the charger 5 is full, it will automatically stop or still keep in a constant charging condition.

When the earthquake contains the vertical vibration, the vertical vibration detecting system can detect it. The vertical vibration detecting system includes a first detecting set and a second detecting set. The first detecting set is composed of a non-conductive vertical vibration adjusting element 31, a wire 32 with a non-conductive outer wrap, a spring holding seat 36, a detective spring 37, a detective element 38, and a weight 310. The second detective set is composed of a non-conductive horizontal vibration adjusting element 21, a hanging spring 33, a detecting tube top cover 34, a half-insulated steel tube 35 having a non-conductive inner wall, and a vertical vibration detective seat 39.

Figure 7:
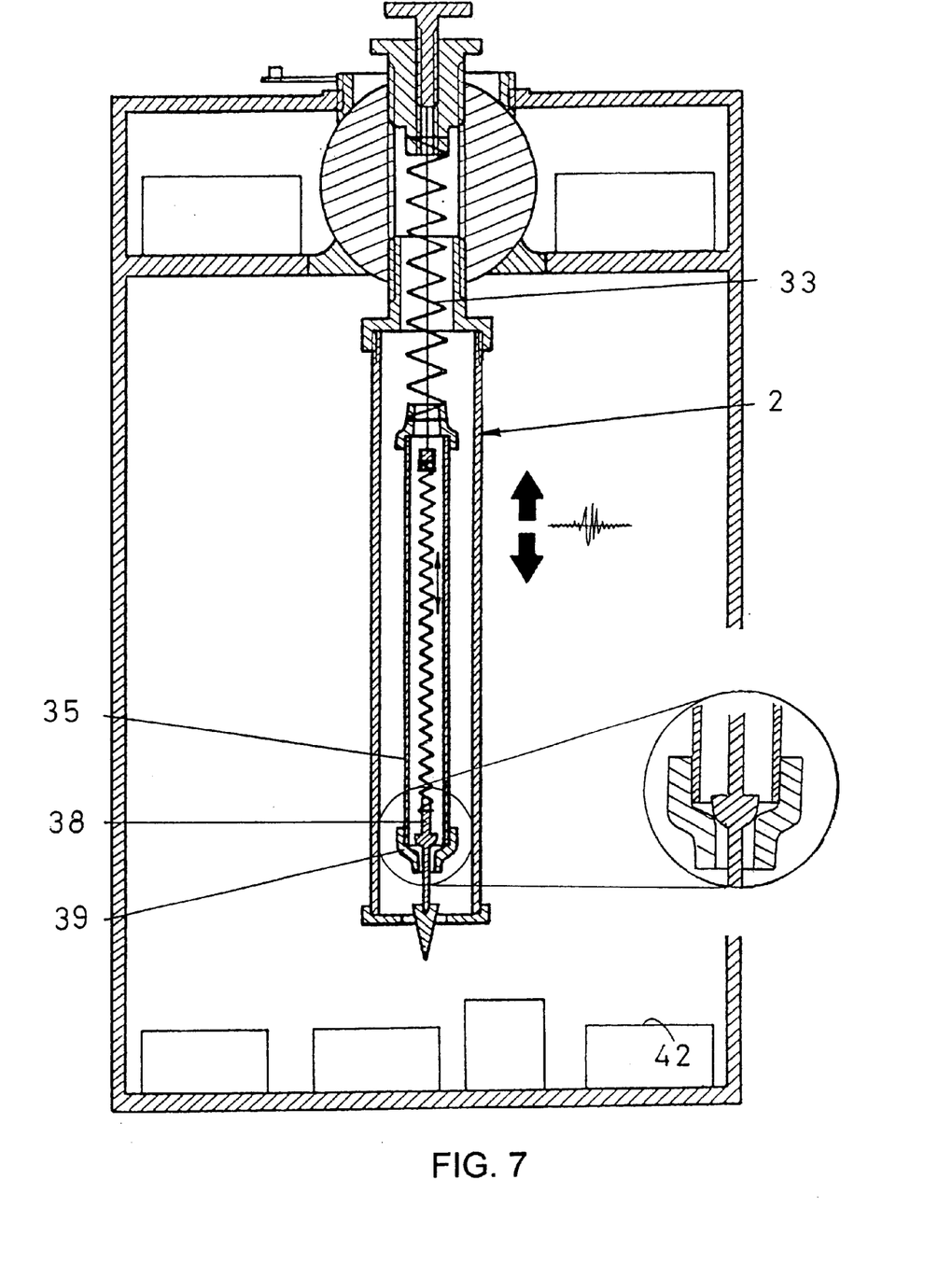
FIG. 7 is a schematic view showing the vertical vibration detecting action.

This vertical vibration detective seat 39 is conductive. When the earthquake contains a vertical vibration, due to the weight 310, the detective spring 37 is repeatedly moving up and down so as to cause a vertically vibration. This detective spring 37 is disposed inside and limited by the half-insulated steel tube 35 and performs a vertical movement, so that the detective element 38 of the first detecting set will contact with the vertical vibration detecting seat 39 of the second detective set. So, this contact will form an electrical loop to activate a vertical alarm 42 (as shown in FIG. 7).

By mean of an outer thread of the vertical vibration adjusting element 31, the first detecting set is engaged into a non-conductive inner thread of the horizontal vibration adjusting element 21 of the second detecting set. And, an outer thread of the horizontal vibration adjusting element 21 is engaged into an inner thread of an upper end of a horizontal sliding ball 13 so as to secure the first and second detecting sets.

Figure 5:
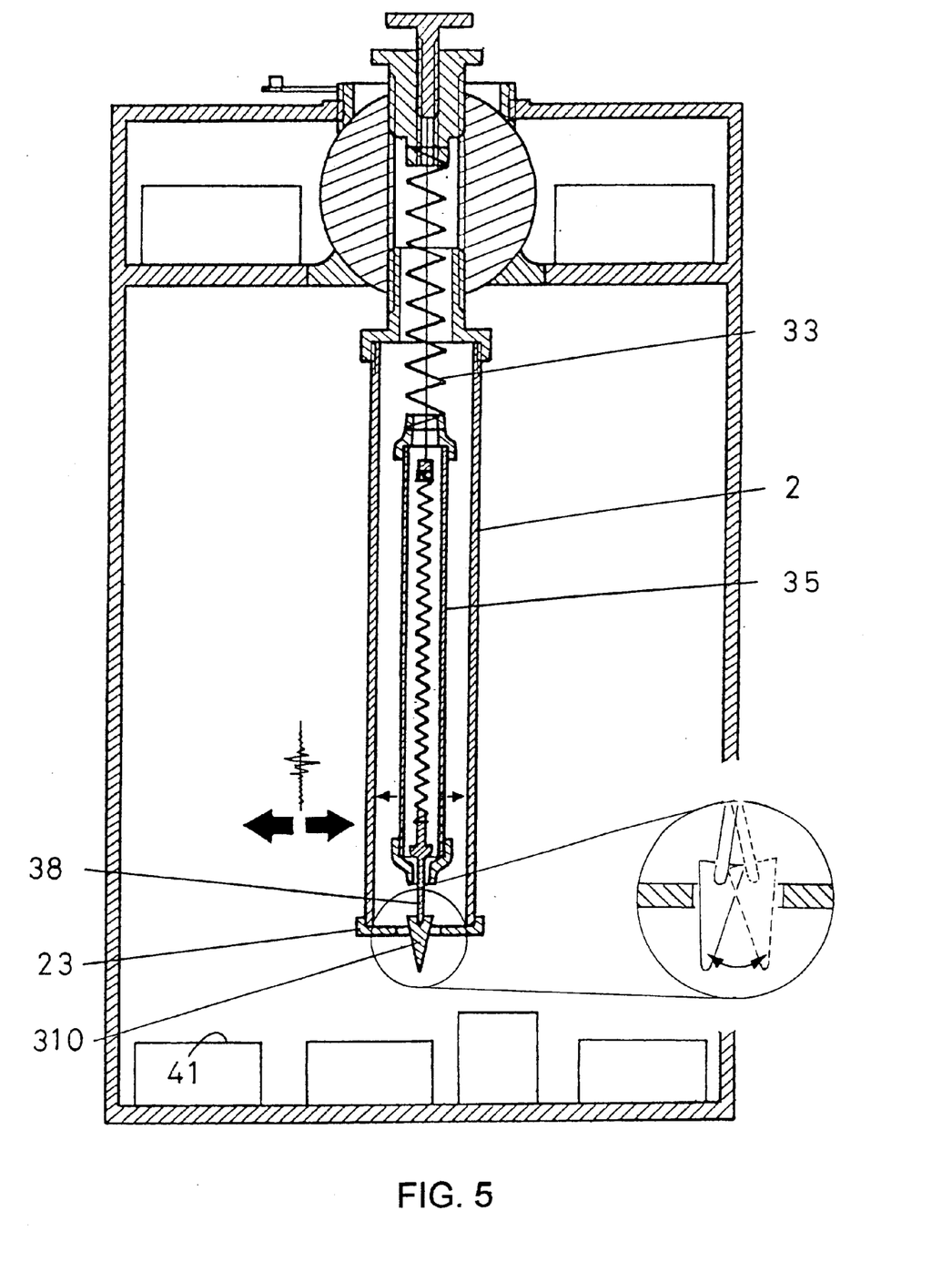
FIG. 5 is a schematic view showing the horizontal vibration detecting action.

When the earthquake contains the vertical vibration, the vertical vibration detecting system can detect it. The horizontal swinging (or vibration) detecting system includes another detecting set. It is composed of a fixed tube upper cover 22, a fixed tube 2 and a horizontal detecting seat 23 (all conductive). Of course, this horizontal vibration detective seat 23 is conductive. When the earthquake wave contains a horizontal vibration, due to the weight 310, the hanging spring 33 is repeatedly horizontally swung so as to cause a horizontally vibration. Thus, the weight 310 will contact with the horizontal vibration detecting seat 23 so as to form an electrical loop to activate a horizontal alarm 41 (as shown in FIG. 5).

In which, an outer thread of the fixing tube upper cover 22 is engaged in an inner thread of a lower end of the horizontal sliding ball 13. So, the sliding ball 13 can be disposed on a horizontal sliding ball seat 14 in the housing 1 with free sliding.

Figures 6, 6A, 6B:
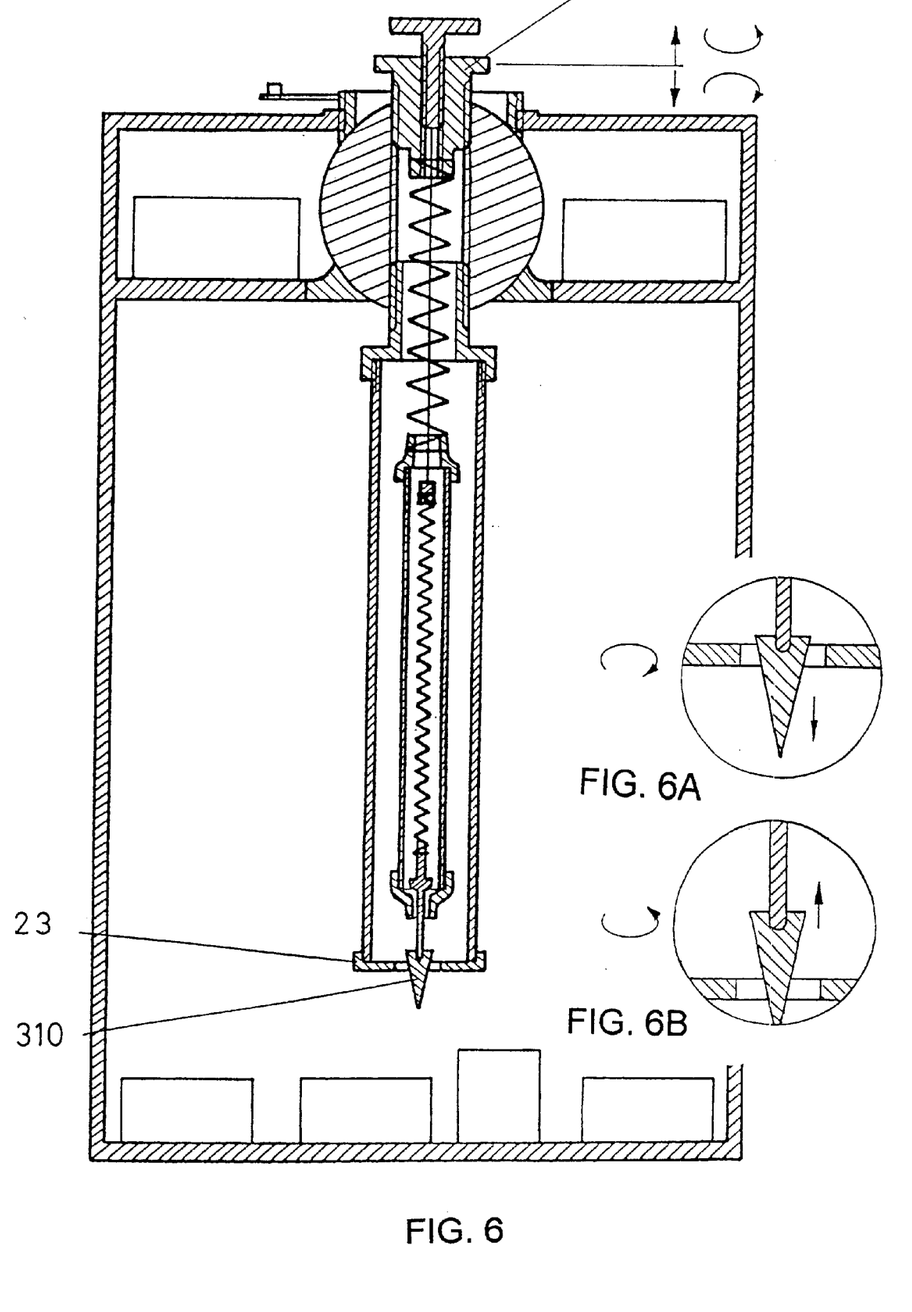
FIG. 6 is a schematic view showing the horizontal detecting sensitivity adjustment.
FIG. 6A and 6B show the adjustment for increasing/decreasing the horizontal detecting.

With regard to horizontal vibration detecting precision adjustment, the horizontal vibration adjusting element 21 is adjustable to change a horizontal ring-like gap between the weight 310 and the horizontal vibration detecting seat 23 so that the sensitivity of horizontal vibration detecting can be adjusted (as shown in FIG. 6). When the horizontal vibration adjusting element 21 is rotated down, the horizontal gap between the weight 310 and the horizontal vibration detecting seat 23 becomes smaller so that the detecting sensitivity increases (as shown in FIG. 6A). If it is rotated up, the detecting sensitivity decreases (as shown in FIG. 6B).

Figures 8, 8A, 8B:
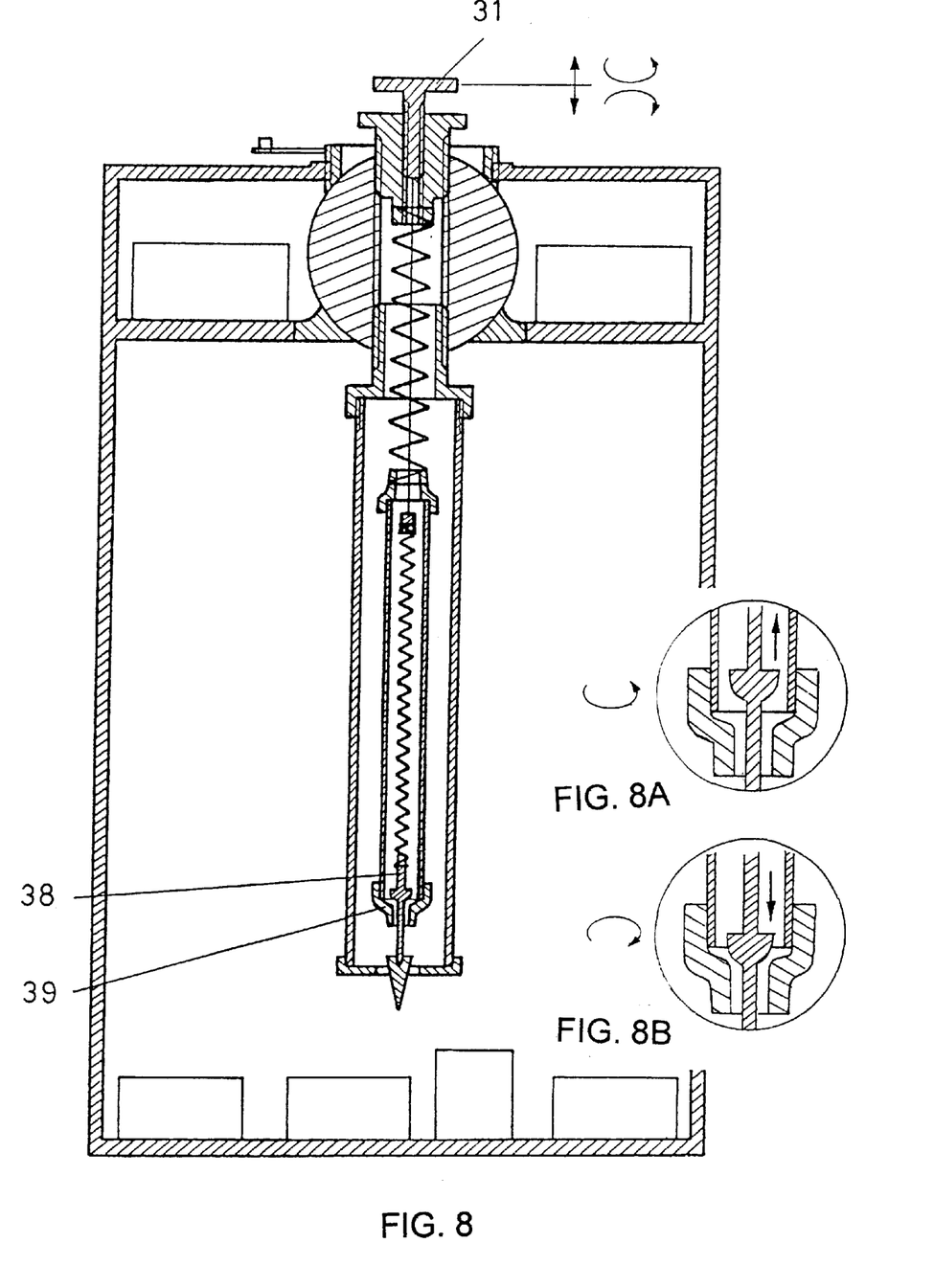
FIG. 8 is a schematic view showing the vertical detecting precision adjustment.
FIG. 8A and 8B show the adjustment for decreasing/increasing the vertical detecting sensitivity.

With regard to vertical vibration detecting precision adjustment, the vertical vibration adjusting element 31 is adjustable to change a vertical gap between the detecting element 38 and the vertical vibration detecting seat 39 so that the detecting sensitivity of vertical vibration detecting can be adjusted (as shown in FIG. 8). When the vertical vibration adjusting element 31 is rotated up, the vertical gap between the detecting element 38 and the vertical vibration detecting seat 39 becomes larger so that the detecting sensitivity decreases (as shown in FIG. 8A). If it is rotated down, the detecting sensitivity increases (as shown in FIG. 8B).

In addition, the horizontal sliding ball 13 on the horizontal sliding ball seat 14 of the housing 1 can automatically make the fixing tube 2 and the detecting tube 3 towards down to the center of the earth so as to achieve the functions of automatically positioning and automatically returning.

Also, the fixing tube locking knob 11 is used to secure the fixing tube 2 at a desired position after installing this invention.

Figure 9:
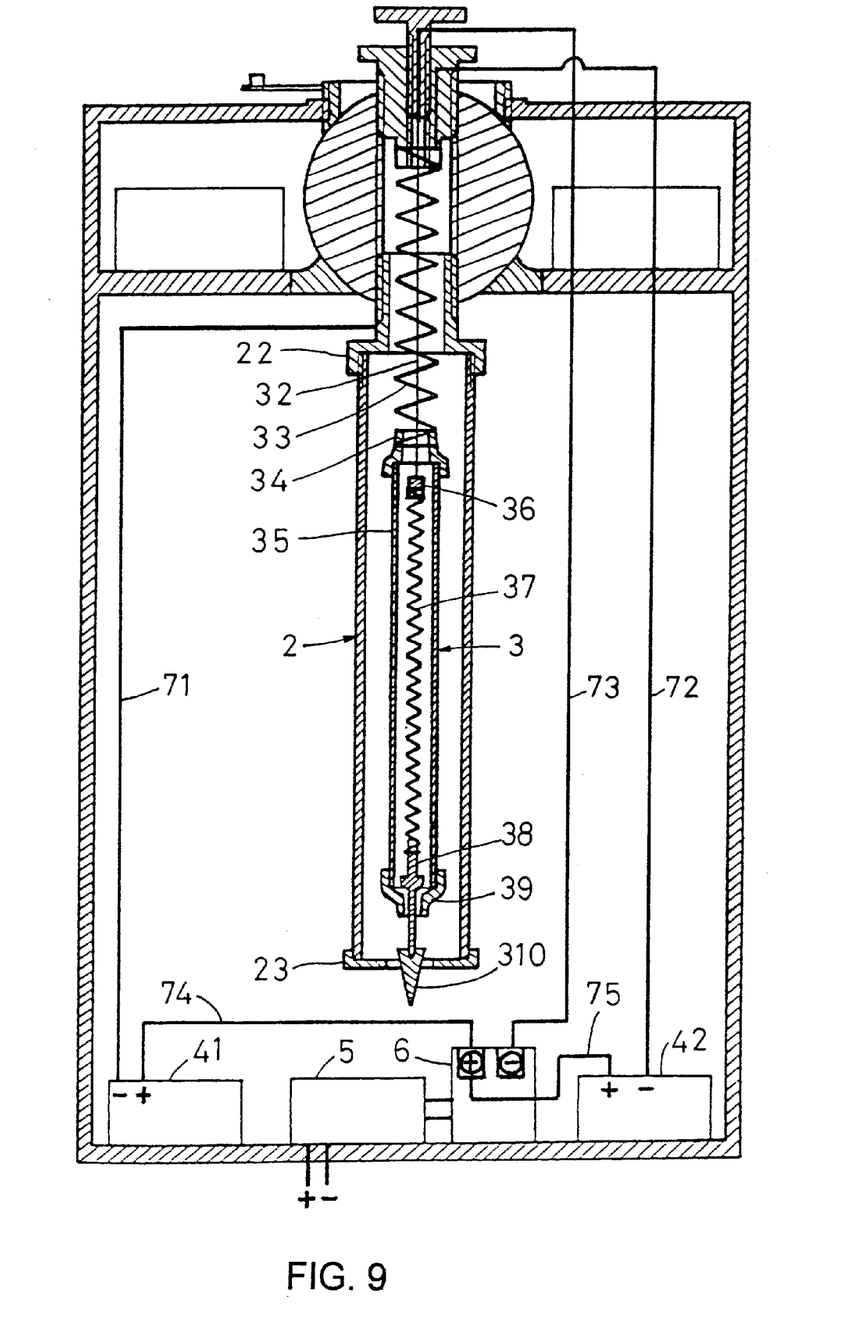
FIG. 9 illustrates the electrical circuit system of the present invention.

For the detailed electrical circuit, it is shown in FIG. 9. The negative pole (means the ground) of the battery 6 is connected to a ground wire 73 and then connected to the wire 32 with a non-conductive outer wrap, the spring holding seat 36, the detective spring 37, the detective element 38, and the weight 310. So, this connection forms a ground route. The positive pole of the battery 6 is connected with two routes. The first route is to connect with the first horizontal detecting wire 74 and then to connect with the horizontal alarm 41, a second horizontal detecting wire 71, the fixing tube upper cover 22, the fixing tube 2 and the horizontal vibration detecting seat 23. Therefore, once the horizontal vibration detecting seat 23 contacts with the weight 310, it forms a close loop so that it will activate the horizontal alarm 41 to output a warning voice. Whereas, the second route from the positive pole is to connected with a first vertical detecting wire 75, and the to connect with a vertical alarm 42, a second vertical detecting wire 72, the hanging spring 33, the detecting tube top cover 34, the half-insulated steel tube 35 having a non-conductive inner wall (such as inserting a plastic film), and the vertical vibration detective seat 39. Once the vertical vibration detective seat 39 contacts with the detecting element 38, it forms another close loop so that it will activate the vertical alarm 42 to output another warning voice.

According to the test results obtained from the aftershocks of the severe earthquake happened in Taiwan on Sep. 21, 1999, and other smaller earthquakes happened in Chia-Yi area in Taiwan, these earthquake can be classified into the vertical vibration type, the horizontal vibration type and the mixed type (having both). However, this invention can precisely detect these three kinds of earthquakes. And, its advantages and functions can be summarized as follows:

(1) East to assemble. This invention can be put on any flat or tilted place. The user does not need to worry about the ground is tilted or not. There is no need to assemble. It can be moved to any position. Also, it can be a decoration in a house or office.

(2) Easy to adjust. Because there are the horizontal sliding ball and the hanging spring, it is easy to adjust this invention to a desired horizontal or vertical condition automatically.

(3) Easy to return to the original state. No matter the vertical or the horizontal vibration, after detecting the earthquake, it will return to the original state without manual operation.

(4) The alarm voices are different by types. This invention can distinguish the earthquake's vibration is the vertical type, the horizontal type or the mixed type, so the alarm voices are one of the two different voices or the mixed voice. Therefore, people will know what type it is and then make a best decision for emergency escape.

(5) Depending on the amplitude of the external interfering vibration, the sensitivities of the vertical and horizontal vibration detecting can be adjusted.

Thus, based on the above description, this invention is very easy to be used by people. There is no complex assembling or installing procedures. Also, except the initial locking procedure for the tilted ground, there is no other adjustment. After detecting the earthquake, this invention will return to its original state automatically. Therefore, it significantly improves the convenience in use. In addition, the detecting precision can be kept and can provide an immediately warning at the crucial moment.

The above embodiments are only used to illustrate the present invention, not intended to limit the scope thereof. Many modifications of the above embodiments can be made without departing from the spirit of the present invention.

What is claimed is:

1. An earthquake alarm device comprising:

a housing, a vertical vibration detecting system, a horizontal vibration system, a battery and an alarm set;

said vertical vibration detecting system including a first detecting set and a second detecting set; said first detecting set being composed of a non-conductive vertical vibration adjusting element, a wire with a non-conductive outer wrap, a spring holding seat, a detective spring, a detective element, and a weight; said second detective set being composed of a non-conductive horizontal vibration adjusting element, a hanging spring, a detecting tube top cover, a half-insulated steel tube having a non-conductive inner wall, and a vertical vibration detective seat; said vertical vibration detective seat being conductive; when an earthquake containing a vertical vibration, due to said weight, said detective spring being moving up and down so as to cause a vertically vibration, said detective spring being disposed inside and limited by the half-insulated steel tube and performing a vertical movement, so that said detective element of said first detecting set contacts with said vertical vibration detecting seat so as to form an electrical loop to activate a vertical alarm of the alarm set; by mean of an outer thread of said vertical vibration adjusting element, said first detecting set being engaged into a non-conductive inner thread of said horizontal vibration adjusting element of said second detecting set; and an outer thread of said horizontal vibration adjusting element being engaged into an inner thread of an upper end of a horizontal sliding ball so as to secure said first and second detecting sets; and said horizontal swinging detecting system including another detecting set which is composed of a fixed tube upper cover, a fixed tube and a horizontal detecting seat; said horizontal vibration detective seat being conductive; when said earthquake containing a horizontal vibration, due to said weight, said hanging spring being repeatedly horizontally swung so as to cause a horizontally vibration, so that said weight contacts with said horizontal vibration detecting seat so as to form an electrical loop to activate a horizontal alarm of the alarm set; wherein an outer thread of said fixing tube upper cover being engaged in an inner thread of a lower end of said horizontal sliding ball so that said sliding ball can be disposed on a horizontal sliding ball seat in said housing with free sliding.

2. The earthquake alarm device as claimed in claim 1, wherein said horizontal sliding ball on said horizontal sliding ball seat of said housing automatically makes said fixing tube and said detecting tube towards down to the center of the earth so as to achieve the functions of automatically positioning and automatically return.

3. The earthquake alarm device as claimed in claim 1, wherein said vertical vibration adjusting element is adjustable to change a vertical gap between said detecting element and said vertical vibration detecting seat so that the sensitivity of vertical vibration can be adjusted.

4. The earthquake alarm device as claimed in claim 1, wherein said horizontal vibration adjusting element is adjustable to change a horizontal ring-like gap between said weight and said horizontal vibration detecting seat so that the sensitivity of horizontal vibration can be adjusted.

5. The earthquake alarm device as claimed in claim 1, further comprising a fixing tube locking knob for fixing said fixing tube at a desired position after automatically positioning.

* * * * *